(12) United States Patent
Hautala (10) Patent No.: US 10,494,763 B2
(45) Date of Patent: Dec. 3, 2019

(54) PROCESSING OF RECYCLED MATERIAL

(71) Applicant: RED WIRE OY, Tampere (FI)

(72) Inventor: Jouko Hautala, Tampere (FI)

(73) Assignee: RED WIRE OY, Tampere (FI)

( * ) Notice: Subject to any disclaimer, the term of this patent is extended or adjusted under 35 U.S.C. 154(b) by 15 days.

(21) Appl. No.: 16/066,742

(22) PCT Filed: Dec. 29, 2016

(86) PCT No.: PCT/FI2016/050937
§ 371 (c)(1),
(2) Date: Jun. 28, 2018

(87) PCT Pub. No.: WO2017/115017
PCT Pub. Date: Jul. 6, 2017

(65) Prior Publication Data
US 2019/0017223 A1    Jan. 17, 2019

(30) Foreign Application Priority Data

Dec. 29, 2015  (FI) ...................................... 20156026

(51) Int. Cl.
| | | |
|---|---|---|
| D21B 1/32 | (2006.01) | |
| D21B 1/34 | (2006.01) | |
| D21D 5/04 | (2006.01) | |

(52) U.S. Cl.
CPC ................. *D21B 1/32* (2013.01); *D21B 1/34* (2013.01); *D21D 5/04* (2013.01)

(58) Field of Classification Search
USPC ........................................................ 162/261
See application file for complete search history.

(56) References Cited

U.S. PATENT DOCUMENTS

| 4,397,713 A | 8/1983 | Lambrecht | |
|---|---|---|---|
| 4,622,099 A * | 11/1986 | Eelman | ..................... D21B 1/32 |
| | | | 162/261 |

(Continued)

FOREIGN PATENT DOCUMENTS

| DE | 2721882 B1 | 5/1978 |
|---|---|---|
| EP | 0812950 A1 | 12/1997 |

(Continued)

OTHER PUBLICATIONS

International Search Report & Written Opinion dated Apr. 4, 2017 corresponding to International Patent Application No. PCT/FI2016/050937.

(Continued)

*Primary Examiner* — Mark Halpern
(74) *Attorney, Agent, or Firm* — Squire Patton Boggs (US) LLP (57) ABSTRACT

An apparatus and a method for processing recycled material, comprising a first pulper (3) having an inlet (2) for receiving recycled material (1), a water inlet (26) for producing a mixture of water and particles of recycled material, a first rotor unit (R1) configured to slush recycled material and a first screen plate (18) connected to a first outlet (20) configured to extract a first portion of recycled material from the first pulper (3); a last pulper (8) having a reject washer configured to remove coarse rejected recycled material from the last pulper (8); and an upper channel (4) from the first pulper (3) to the last pulper (8), wherein the mixture of water and particles of recycled material is configured to flow over from the first pulper (3) to the last pulper (8). The apparatus comprises a of the last pulper (8) being lower than or at the same level as the first pulper (3); a lower channel (40) at the bottom of the first pulper (3) extending to the last pulper (8); and a gate (45) at the lower channel (40), configured to (Continued)

cause, when open, the mixture of water and particles of recycled material to flush to the last pulper (8).

15 Claims, 7 Drawing Sheets

(56) References Cited

U.S. PATENT DOCUMENTS

| | | | | |
|---|---|---|---|---|
| 4,818,338 A | * | 4/1989 | Bahr | D21B 1/32 |
| | | | | 162/4 |
| 4,818,339 A | * | 4/1989 | Lamort | D21B 1/32 |
| | | | | 162/4 |
| 4,891,099 A | * | 1/1990 | Silveri | D21B 1/028 |
| | | | | 162/261 |
| 6,651,679 B2 | * | 11/2003 | Danger | D21B 1/32 |
| | | | | 134/16 |
| 7,461,744 B2 | * | 12/2008 | Hautala | D21B 1/32 |
| | | | | 209/270 |
| 2004/0256071 A1 | * | 12/2004 | Huhtamaki | D21B 1/026 |
| | | | | 162/189 |
| 2005/0121371 A1 | | 6/2005 | Hautala | |
| 2015/0090416 A1 | | 4/2015 | Nakamura | |
| 2019/0022663 A1 | * | 1/2019 | Hautala | B02C 23/16 |

FOREIGN PATENT DOCUMENTS

| | | |
|---|---|---|
| EP | 1215334 A1 | 6/2002 |
| EP | 2388373 A1 | 11/2011 |
| EP | 2 873 769 A1 | 5/2015 |
| FI | 118970 B | 5/2008 |
| WO | 2009115636 A1 | 9/2009 |

OTHER PUBLICATIONS

Jul. 5, 2019 Extended Search Report issued in European Patent Application No. 16881330.1.

* cited by examiner

PROCESSING OF RECYCLED MATERIAL

This application is a 371 of PCT/FI2016/050937 filed 29 Dec. 2016

BACKGROUND

Examples of material suitable for recycling are paper with pulp content, paperboards, cartons, fiberboards, packing material or bio waste. Such recycled material may contain various impurities that may not be utilized in the same process with the recycled material, such as plastic, sand, glass, metal and blocks of wood. These impurities must be removed from the recycled material, for example from pulp, before the pulp is used in further processes. Purified pulp may be utilized in making paper or carton, while purified bio waste is suitable for producing biogas. The impurities may be utilized in other processes.

FI118970 discloses one method for cleaning impurities from recycled paper, wherein separate pulpers and processing stages of the rejected recycled material have been connected with pipework or screw conveyors. Hereinafter in this document the rejected recycled material is referred to as reject and the accepted recycled material is referred to as accept. The description according to FI118970 of the method for purifying recycled material comprising paper and paperboard is hereby incorporated by reference. In one embodiment, between vertical pulpers there is one vertical clarifying pipe for separating heavier rejects. The rejects from the first pulper travel to the last pulper through the clarifying pipe to be slushed and purified. From the last pulper, coarse reject is transferred with a slanted screw conveyor to reject processing—in this example a two-part rotating reject drum. Gravitation moves the reject from the first pulper to the last pulper. Tall vertical pulpers require a high reaching and long conveyor for the first pulper, thus requiring plenty of space of the processing facility. If the process must be interrupted, due to malfunction or due to sequential processing, removing the coarse material is very time-consuming. The duration of the material removal process is equal to the material purifying process. Long duration of the material removal process decreases the overall capacity.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

The devices for processing the recycled material are arranged in horizontally positioned vessels, wherein the process proceeds horizontally from one vessel to another. In one embodiment the apparatus comprises a single tank or vessel that has been partitioned with partitioning walls. The single tank or vessel is positioned horizontally or in a slightly tilted position allowing the rejects to flow from one processing stage to another.

Particles of recycled material that are heavier than water will settle at the bottom of the vessel, as will the material containing impurities or material that is difficult to pump between process stages. The material settling at the bottom may be transferred to the next process stage with the help of gravity. The pumps deliver material that may be pumped easily, such as the mixture of pulp and water.

The impurity level on the recycled material may be high, for example 60%. According to one definition, impurities refer to almost or fully non-slushing materials that cannot be used for the purposes of manufacturing paper, carton or biogas. Examples of impurities are plastic, glass, metal, sand, stones. One example of a common bio waste impurity is metal from kitchen cutlery.

The apparatus may be configured in a single, longitudinal horizontal vessel, for example a tank that is simple to manufacture and transport. The required space related to the production capacity is small. According to one embodiment the recycled material such as material containing fibers or bio waste is slushed, screened and purified. The coarse reject and particles heavier than water are separated in a single horizontal tank or vessel, wherein different stages of the process are separated with partition walls.

The solution is a simple, continuous process that is easy to control. The solution enables shallow, low-cost construction. The solution enables fast and effective flushing of rejects during a sequential process or during malfunction. Pumps are not needed to flush the system, as all stages from the material inlet to the final coarse reject stage are performed sequentially, wherein the vessels are positioned horizontally or gradually decline towards the final stage.

Many of the attendant features will be more readily appreciated as they become better understood by reference to the following detailed description considered in connection with the accompanying drawings. The embodiments described below are not limited to implementations which solve any or all of the disadvantages of the prior art.

BRIEF DESCRIPTION OF THE DRAWINGS

The accompanying drawings, which are included to provide a further understanding of the invention and constitute a part of this specification, illustrate embodiments of the invention and together with the description help to explain the principles of the invention. In the drawings.

DETAILED DESCRIPTION

Reference will now be made in detail to the embodiments of the present invention, examples of which are illustrated in the accompanying drawings. Any range or device value given herein may be extended or altered without losing the effect sought.

Figure 1:
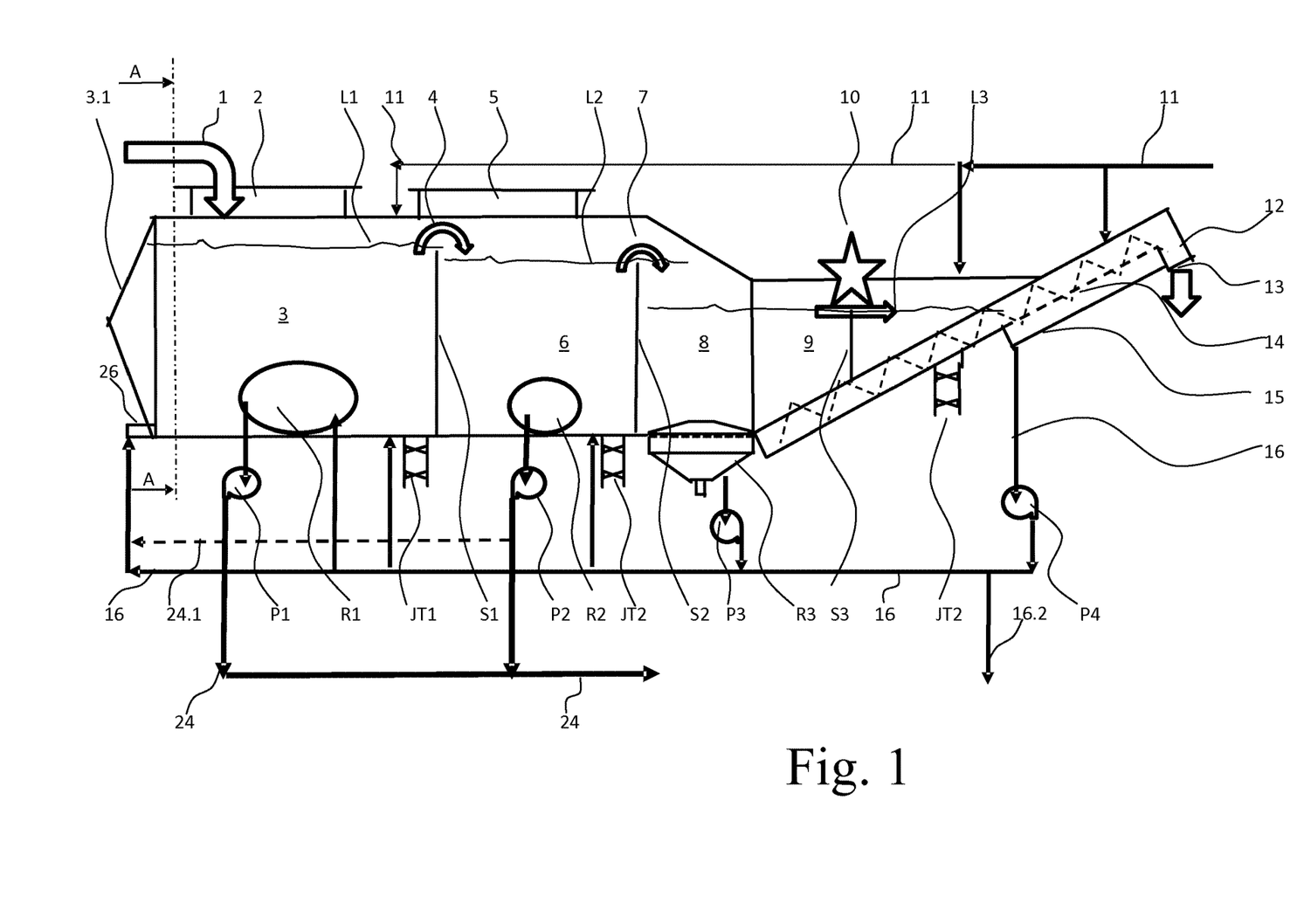
FIG. 1 is a schematic diagram of an embodiment of the apparatus for processing recycled material.

FIG. 1 illustrates one embodiment of processing of the recycled material. The recycled material 1 is delivered to a first pulper 3 via an inlet 2. The opening 2 may be used for maintenance purposes. In this example the first pulper 3 is referred to as a first pulper 3. In one embodiment the recycled material 1 contains pulp; in one embodiment it contains bio waste material. The recycled material may be anything suitable for screening through a screen plate 18 and slushing with a rotor 17. The rotor 17 causes the recyclable material to move and decompose for example into fiber material as a result of movement. The first pulper 3 is defined between a first end 3.1 of the tank and a partitioning wall S1.

Figure 3:
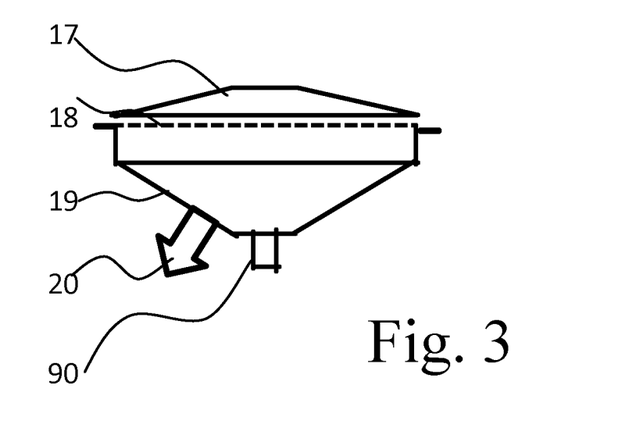
FIG. 3 shows a schematic view of a rotor unit according to an embodiment.
Figure 4:
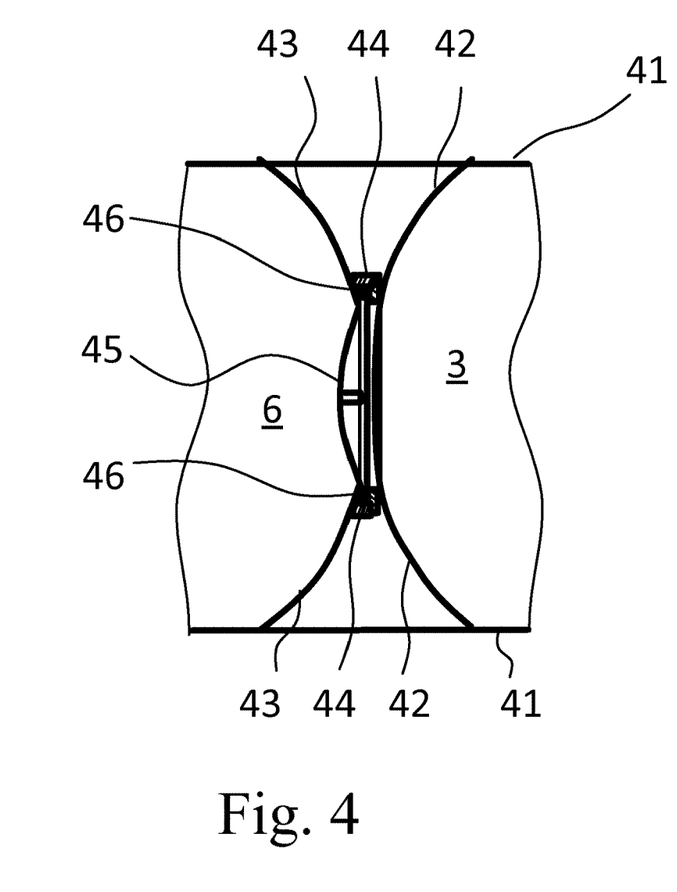
FIG. 4 is a schematic illustration of the partitioning wall.
Figure 5:
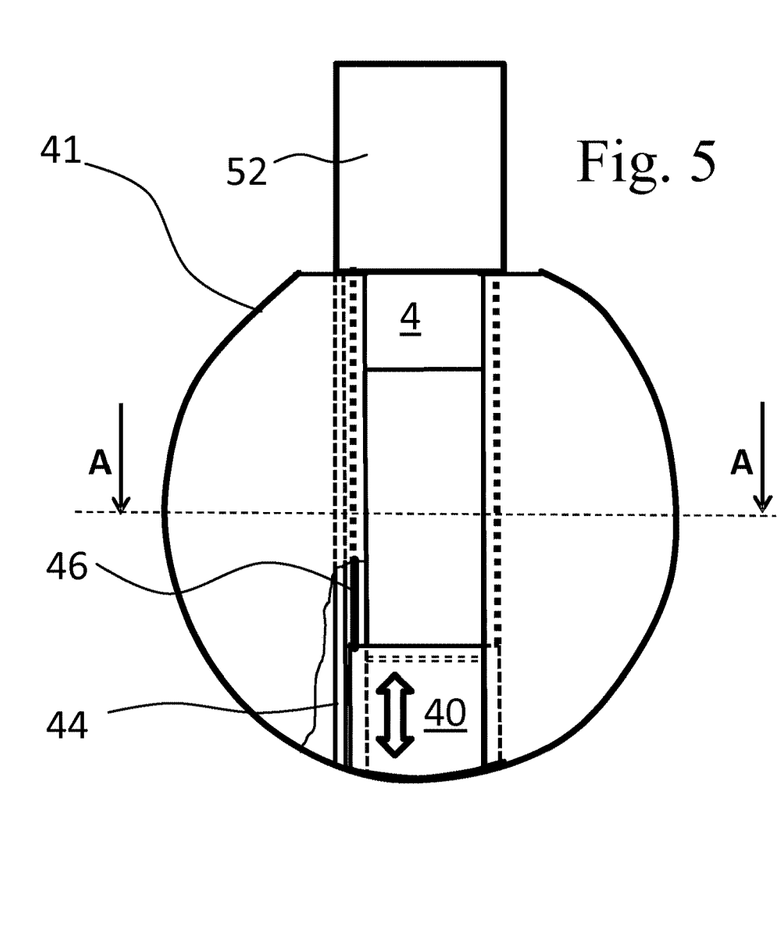
FIG. 5 is a second schematic illustration of the partitioning wall.

A rotor unit R1 comprises a rotor 17 configured to slush the recycled material. FIG. 3 illustrates a schematic view of the structure of the rotor unit. The diluting water for the first pulper 3 and the intermediate pulper—pulper 6—is delivered to an inlet 26 via pipework 16. The last pulper—pulper 8—provides the diluting water containing a small amount of pulp to the pipework 16 with pumps P3 and P4. The additional water for the process is received from second pipework 11. In one example of a purifying process, water is added to the recycled material to slush it in the rotor unit R1, wherein the impurities are separated in various steps with screening and gravity.

The particles of recycled material that has been slushed into fibers or pulp in the first pulper 3 flow through a rotor unit R1 screen plate 18 to a pump P1, from where the processed material flows via pipework 24 to further processing. Particles of recycling material that are heavier than water accumulate into a junk trap J1, from wherein they may be periodically removed. A portion of the recycled material is not pumped out of the first pulper 3; for example, the size of the particles may be too large to enter through the first screen plate 18; instead it flows over the partitioning wall S1 via the upper channel 4 to the intermediate pulper 6, hereinafter intermediate pulper 6, as the top of the partitioning wall S1 is open. Similar overflow may occur between consecutive pulpers. The intermediate pulper 6 comprises a maintenance hatch 5. The intermediate pulper 6 is defined between partitioning walls S1 and S2. The intermediate pulper 6 comprises an intermediate rotor unit R2 and a rotor 17 configured to slush the pulp material that did not turn into slush in the first pulper 3. The intermediate rotor unit R2 of the intermediate pulper 6 rotates the rotor of the rotor unit R2. The slushed material flows through the screen plate 18 of the intermediate rotor unit R2 and an intermediate pump P2 pumps the material into pipework 24 to be further processed.

In an embodiment the pulp water pumped by the intermediate pump P2 is returned to the first pulper 3 via pipework 24.1. and the pipework 16. In one embodiment, only a portion of the pulp water is returned to the first pulper 3. The returning water via the pipework 24.1 may increase the overflow amount of the mixture of particles and water. The intermediate pulper 6 comprises an intermediate junk trap JT2. Particles of recycling material that are heavier than water accumulate into the junk trap JT2, from wherein they may be periodically removed. A portion of the recycled material not removed from the intermediate pulper 6 flows over an opening 7—an upper channel 7—on the partitioning wall S2 to the last pulper 8. The material passing to the last pulper 8 is in one embodiment coarse reject such as plastic or other solid material such as packing material, styrofoam or blocks of wood. The coarse reject has not passed through the first pulper rotor unit's 3 or through the intermediate rotor unit's 6 screen plate 18 openings.

The last pulper 8 is defined between the intermediate wall S2 continuing as a conveyor vessel 9 rising as a screw conveyor 12. The screw conveyor 12 is configured to be open on the top side and with tight contact, being securely connected to the bottom of the rising vessel bottom 9. The screw conveyor rises gradually upwards with the lower end of the screw conveyor 12 at the bottom level of the last pulper and the upper end above the surface L3 of the last pulper 8 and the conveyor vessel 9. The last pulper comprises a rotor unit R3 configured to slush any carton or paper that has remained solid through the previous stages. The rotor unit R3 comprises a screen plate 18, through which low-concentration pulp water is pumped with the pump P3 to dilute the content of the first pulper 3, the intermediate pulper 6, the first junk trap JT1 and the intermediate junk trap JT2.

The pipeworks 11, 16, 16.1, 24 and 24.1 comprise a relevant amount of valves that may operate manually or automatically. The flow of water, the diluting water or the flow of recycling material may be adjusted with manual valves or adjusting valves. If the water is purposed for dilution, the concentration may be controlled with manual valves or adjusting valves. The conveyor vessel 9 of the last pulper 8 comprises in the tapering portion a partitioning wall S3 which is open from the top portion and allows the conveyor screw 12 to move the coarse reject and heavy reject underneath the partitioning wall S3. A portion of the coarse reject may travel over the partitioning wall S3.

The remaining coarse reject is transferred over the open portion. In one embodiment a rotating rake 10 delivers the remaining coarse reject to be transferred to the top portion of the screw conveyor 12. The rotating rake assists coarse and large particles to be transferred to the final end of the apparatus. A final junk trap JT3 is configured under the screw conveyor 12, wherein the screw conveyor 12 transfers from its lower portion the particles heavier than water. Examples of such particles are sand, small staples and small pieces of glass.

The top end of the screw conveyor 12 comprises a screen plate 14 bent according to the shape of the screw conveyor 12, having openings allowing the pulp water to flow into a box 15 configured under the screw conveyor 12. The pulp water is pumped with a pump P4 along the pipework 16 for diluting the content of the first pulper 3 and the intermediate pulper 6. The screw conveyor 12 transfers the coarse impurities separated from the recycled material into the top portion of the screw conveyor 12, leading them into an opening 13 to be processed further.

The first pulper 3 comprises in one embodiment the largest rotor unit R1, as the first pulper 3 comprises the largest pulper vessel compared to the consecutive pulpers. In one embodiment the rotor unit R1 is configured in an inclined position in the lower portion of the vessel. When the rotor units are installed in a cylindrical tank, their equipment residing outside the tank is not positioned under the tank; therefore, the tank can be installed in a lower position. In one embodiment the intermediate rotor unit R2 is configured in an inclined position in the lower portion of the intermediate pulper.

The rotor unit R3 of the last pulper 8 is in one embodiment installed in a vertical position, having the screen plate 18 in a horizontal position. This causes the mixture of the recycled particles and water or the pulp to exit through the last rotor unit R3 and pipework 16 and 16.2 when gates 45 of all the partition walls S1, S2 are open to the last pulper 8. In one embodiment the first pulper has the largest volume and the last pulper 8 has the smallest volume. In one embodiment the first pulper 3, the intermediate pulper 6 and the last pulper 8 are configured in a tank, configured in a cylindrical and horizontal position. A horizontally positioned tank lowers the overall height of the system compared to vertically installed vessels. In one embodiment the vessels of the first pulper 3, the intermediate pulper 6 and the last pulper 8 consist of a same horizontal and cylindrical vessel or tank that is separated by partition walls S1 and S2. The partition walls S1 and S2 are further illustrated in FIGS. 4 to 8. The lower portion of the partition walls S1 and S2 comprises a gate 45 configured to be opened.

In one embodiment the surface level L1 of the first pulper 3 is defined by a lock sill 4 in the top portion of the partition wall S1. In one embodiment the surface level L2 of the intermediate pulper 6 is defined by a lock sill 7 in the top portion of the partition wall S2. The lock sill 7 is positioned lower than the lock sill 4 to enable the flow from the first pulper 3 to the intermediate pulper 6 with the help of gravity. Correspondingly, the surface L3 of the last pulper 8 is lower than the surface L2 of the intermediate pulper 6. The surface level L3 is controlled by adding more water to the last pulper 8 from the second pipework 11 according to the default setting or the surface level L3.

In one embodiment the recyclable material 1 is paper or cardboard and it is brought into the first pulper in a dry matter content between 80& and 100%. Domestic bio waste material may contain a significantly lower dry matter content, for example 30%. Purifier pulp may exit the first pulper 3 and the intermediate pulper 6 at a 1% to 5% concentration along the pipework 24 to further processing. Purified bio waste may exit at a concentration between 5% and 20%. The required water may be received from the second pipework 11 mainly to the last pulper 8, the conveyor vessel 9 and to the top portion of the screw conveyor. When the water has passed through the starting end of the last pulper 8, it is mixed with fibers and pulp and exits through the last rotor unit's R3 screen plate 18 as diluting water along the pipework 16. The added water from the second pipework 11 is in one embodiment the purest water introduced to the system; therefore, it is the most effective in washing first the coarse reject from the fibers and pulp and after that pumping it into the first pulper 3 or to the intermediate pulper 6, according to the principle of counter current washing.

The dry matter content applied in the process in different pulpers is in one embodiment for the pulp content of recyclable material for the first pulper 3 between 3% and 20%. In one embodiment, when the recyclable material is bio waste, the dry matter content is between 12% and 25%. In the intermediate pulper 6 the dry matter content is in one embodiment about half of the first pulper's 3 dry matter content—in the last pulper 8 the dry matter content may be even lower. In an embodiment the first pulper 3 has a higher concentration of the pulp material; therefore, the first junk trap JT1 separates only the largest particles that are heavier than water. Above the intermediate junk trap JT2 in the intermediate pulper 6 the concentration is lower; therefore, the intermediate junk trap JT2 gathers smaller particles that are heavier than water as compared to the first junk trap JT1. In the last pulper 8 and in the conveyor vessel 9 the mixture concentration is lower, thereby enabling the screw conveyor to transport sand and other small particles to the intermediate junk trap JT3.

Figure 2:
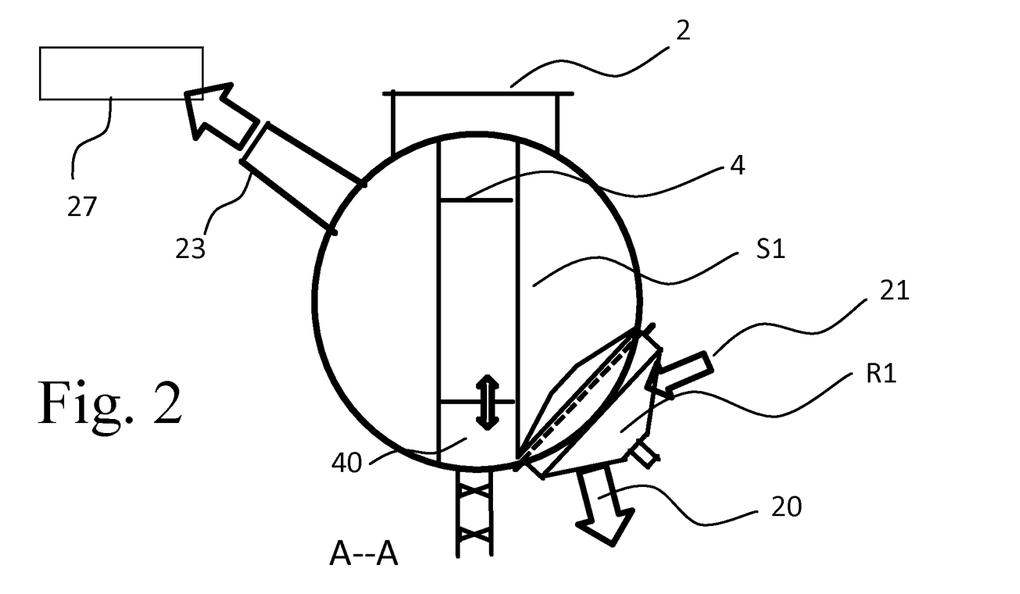
FIG. 2 is a cross-sectional illustration of one embodiment of the apparatus.

For example, recyclable material containing cardboard boxes has been packaged using steel wire or plastic binder or rope into a bale. If such bales are allowed to enter the first pulper 3 with all the bindings, they are removed with a ragger 27, shown in FIG. 2, illustrated along the cross-sectional path A-A. Inside the first pulper 3 the binding material may form into a rope that is pulled out along a pipe installed in the vessel. The pipe has been installed in perpendicular alignment to the first rotor unit R1, causing the end of the rope formed by the threads and bindings to rotate with the rotor 17, thereby increasing the rope formation. The rope pulling speed of the ragger 27 is controlled according to the rope formation speed.

FIG. 3 illustrates one embodiment of a rotor unit that may be utilized in one embodiment with the present pulper. The pulper is configured to rotate a rotor 17. Under the rotor there is a screen plate 18 installed to a cylindrical body 19. An outlet 20 is attached to the body 19 for removing the pulp. An axle 90 is configured to rotate the rotor 17.

In one embodiment the last pulper 8, the conveyor vessel 9 and the conveyor 12 form a reject washer. The reject washer is configured to wash the reject to be lifted from the vessel or tank, wherein a portion of the pulp is washed from the reject. The reject is lifted from the reject washer with a lifting means, causing most of the water to separate from the reject. That causes the reject to become dry to be used for other purposes. The description does not limit the number of pulpers to three units. In one embodiment the apparatus comprises the first pulper 3 and the last pulper 8. The apparatus may comprise more than one intermediate pulper 6. The number and sizing of the pulpers may vary according to the characteristics of the recyclable material. A rotating rake may be installed to the overflow positions 4, 7 or to the upper channels 4, 7. The lower portions of the partition walls S1 and S2 comprise a gate 45 configured to open. The gate 45 opens in one embodiment the bottom portion of the vessel and a lower channel 40 between the pulpers.

During the purifying process the gates 45 and the lower channels 40 are closed. When the pulpers 3, 6, 8 are emptied, the pulp mixture is first removed via the rotor units R1, R2 through the screen plates to the outlet 20. Diluting water is provided via pipework 16 and inlet 26 to the first pulper 3 end 3.1. Opening the gate 45 causes the diluting water to flow through the gate via the lower channel 40 to the last pulper 8. Any remaining artifacts or particles flow with the water through the lower channel to the last pulper 8, wherein the particles are in one embodiment plastic particles. The reject travels to the screw conveyor 12 configured to move the reject through the opening 13 to exit the process. The apparatus is flushed conveniently and quickly.

In one embodiment the upper channel and/or the lower channel comprises an opening in the partition wall between two consecutive pulpers. In one embodiment the upper channel and the lower channel comprise a tube or a pipe between two consecutive pulpers. A channel allows the mixture of water and particles of recycled material to flow to the consecutive pulper, from one vessel to another. A consecutive upper channel is defined as the upper channel leading from the consecutive pulper 6 to the last pulper 8 or to another consecutive pulper 6. A consecutive lower channel is defined as the lower channel leading from the consecutive pulper 6 to the last pulper 8 or to another consecutive pulper 6. In one embodiment the channel is positioned horizontally. For example water added to a pulper flushes the pulper content through the channel. The flushable material is for example a mixture of water and particles of recycled material, debris and/or coarse reject material. In one embodiment the channel is in a declined position allowing the gravity to enhance the flushing to the consecutive pulper.

The increased pulper capacity increases the tank or vessel volume. The capacity may be increased merely by increasing the length of the device—the apparatus may retain the same height even with an increased capacity. Increasing the capacity by increasing the length of the device is more economical than increasing the diameter. The increased length may encompass many of the same components as its shorter version. In one embodiment the first pulper 3 capacity is increased by installing multiple rotor units inside the first pulper 3. The capacity may also be increased by an additional intermediate pulper 6.

Figure 9:
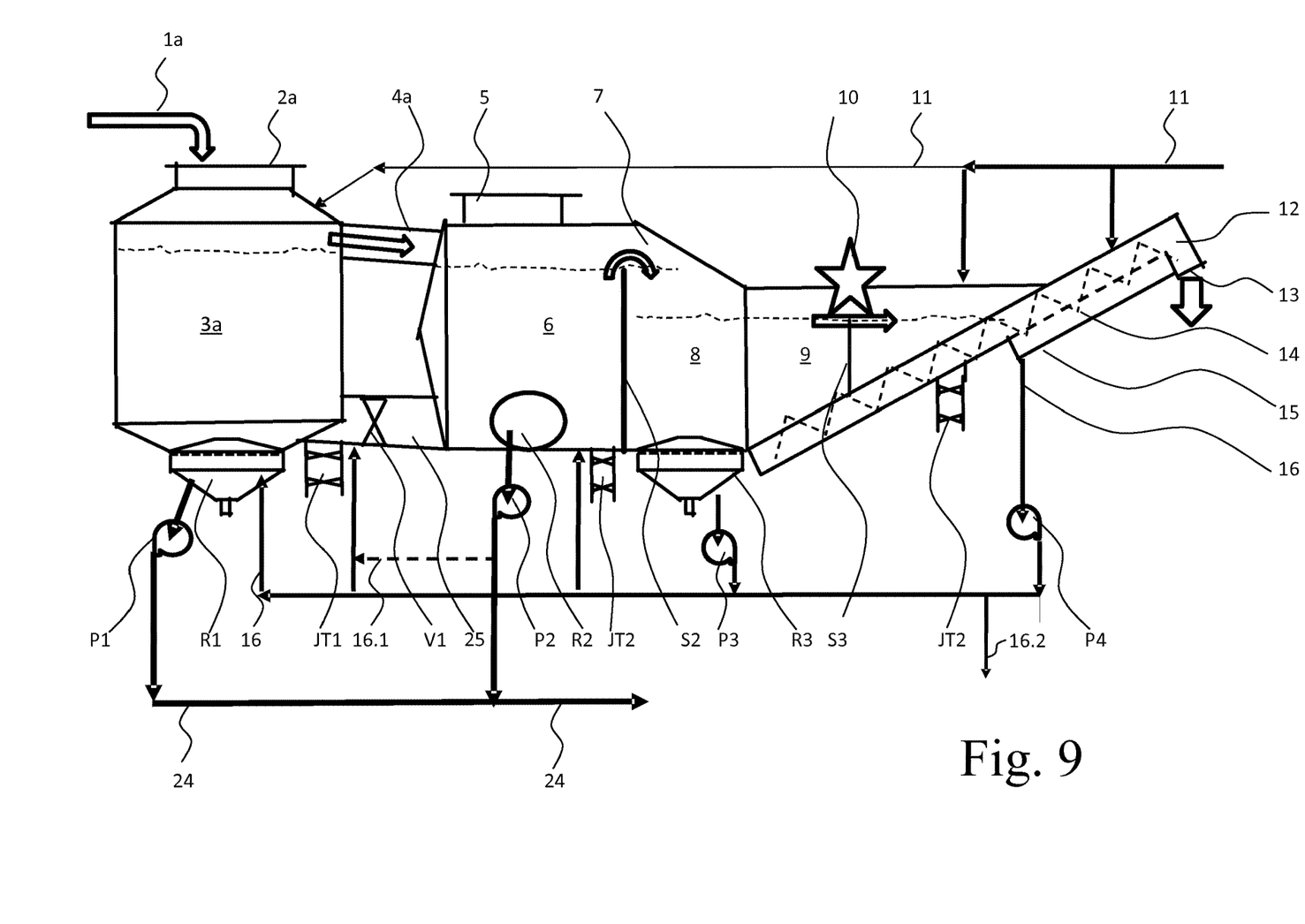
FIG. 9 shows one schematic embodiment of applying the present solution in a recycling process apparatus according to prior art.

In one embodiment the solution is applied to previously installed pulp recycling processes. The solution would improve the coarse reject washer, thereby reducing the loss in pulp processing and increasing the capacity of the apparatus. The principle is illustrated in FIG. 9. A first pulper 3a may comprise elements of a pulper according to the prior art, wherein the extension of the intermediate pulper 6 and the last pulper 8 increases the capacity of the process. The first pulper 3a may be installed vertically or horizontally. The rotor unit R1 may be installed in the horizontal position, vertical position or in the inclined position on the wall of the vessel. The intermediate pulper 6 is connectable to the first pulper 3a with the bottom level of the intermediate pulper 6 positioned at a lower level than the bottom level of the first pulper 3a, a similar arrangement applying to the last pulper 8. To the first pulper 3a is connected the intermediary pulper with two new channels 4a, 25. An upper channel 4a is configured to allow the mixture of water and particles of recycled material to flow over to the consecutive pulper. A lower channel 25 is configured to open via a gate V1 that is in this example a valve. The modified process operates in a manner similar to the process of FIG. 1. The lock sill 4 is replaced by a pipe or tube 4a configured to deliver the overflow to the consecutive vessel. The apparatus may be flushed through the lower channel 25, in this example a drain pipe 25 and a valve V1. The first pulper 3a may be equipped with a new rotor unit illustrated in FIG. 10.

One embodiment of the partition walls S1 and S2 is illustrated in FIGS. 4-8, wherein the partition wall S1 is configured between the first pulper 3 and the intermediate pulper 6; the partition wall S2 is configured between the intermediate pulper and the last pulper 8. A curved plate 42 is installed to the pulper casing 41 on one side of the partition wall. The opposite side comprises two curved segments 43 that are installed to the pulper casing 41 and from the center to vertical L-shaped beams 44 that are installed on the curved plate 42.

Figures 6, 7:
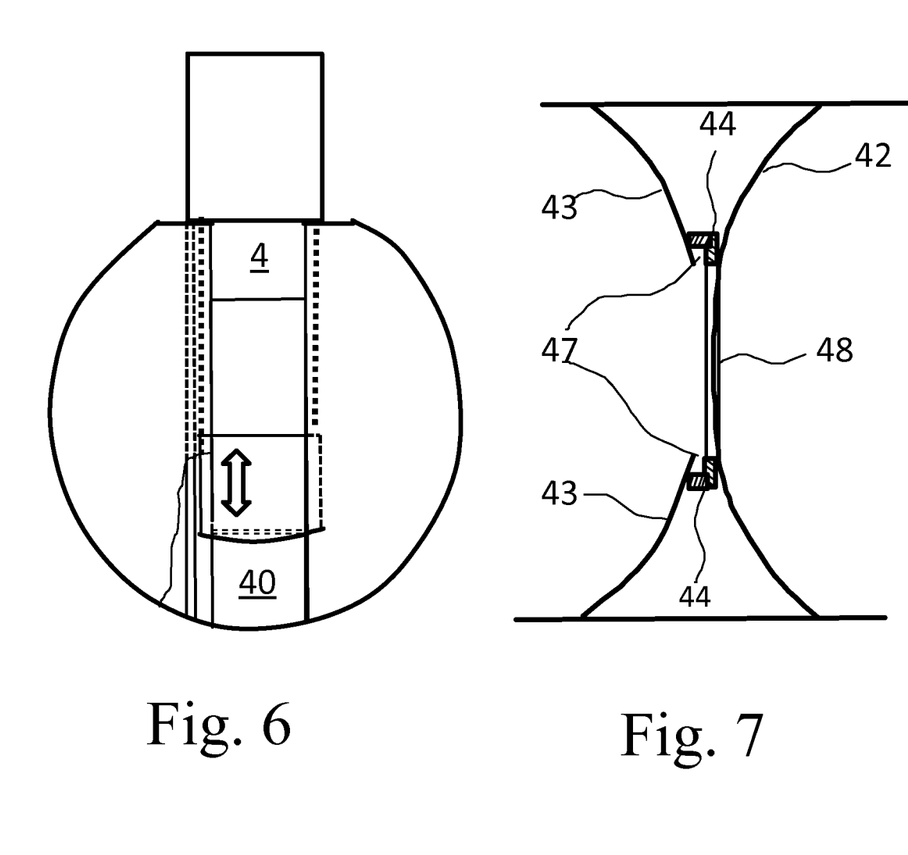
FIG. 6 is a third schematic illustration of the partitioning wall.
FIG. 7 is a fourth schematic illustration of the partitioning wall.
Figure 8:
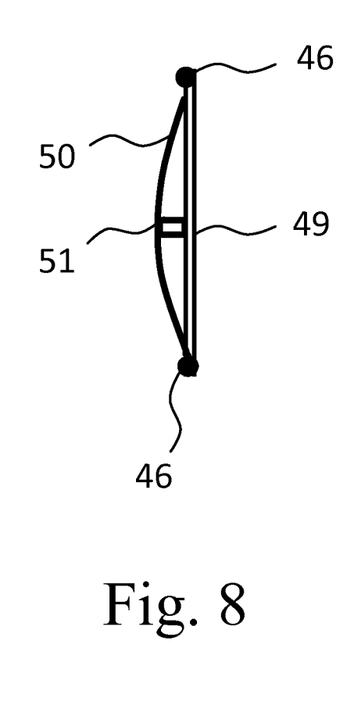
FIG. 8 is a fifth schematic illustration of the partitioning wall.

The beams 44 are parallel, having a distance of about 0.5 m. The curved plate 42 comprises two openings between the beams 44. The opening 4 or 7 at the upper portion acts as the upper channel and causes the overflow between two consecutive pulpers. The channel 40 is configured to flush the two consecutive pulpers. The gate 45 is closed in the lower position and open in the upper position. The structure of the vertically movable gate 45 is illustrated in FIGS. 7 and 8. FIG. 7 is a cross-sectional view of the partition walls S1, S2 without the gate 45. FIG. 8 illustrates a cross-sectional view of the gate 45. Two grooves 47 extend vertically from the bottom of the vessel to the upper portion of the vessel. The grooves 47 are configured for slideably mounting the gate 45. The gate 45 comprises a planar plate 49, supported by a cured plate 50 and a support section 51 that are joined together. In one embodiment the upper edge of the gate 45 is straight or at least configured to block the channel; the lower edge is formed to conform to the bottom of the vessel. According to one embodiment the gate 40 is not watertight; the pulp may block any small leakages of the gate 40 without affecting the capacity of the system.

Two bars or beams 46 are configured to the upper portion of the gate 45, wherein the beams are connected to a lifting mechanism 52 configured to raise the gate for about 0.5 cm. When the gate 45 is in the upper position, a channel 40 is formed under the gate, causing the material remaining at the bottom of the pulper to flush to the consecutive pulper. The lifting mechanism may be hydraulic, pneumatic, mechanic or manual. The partition walls are in one embodiment mirror copies of each other.

Figure 11:
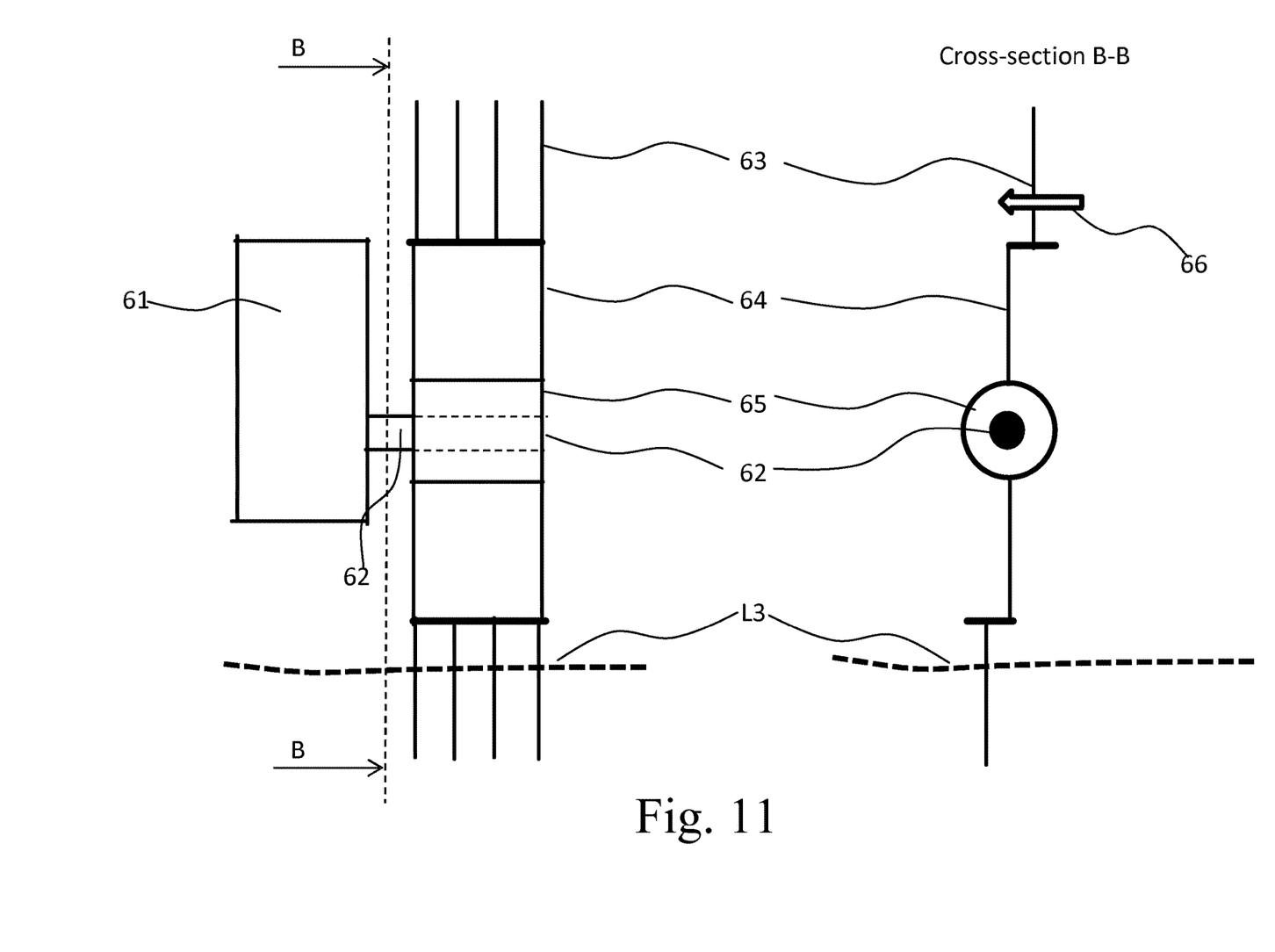
FIG. 11 illustrates one schematic embodiment of a rake configured in the final stage.

FIG. 11 illustrates the principle of the rotating rake 10. In one embodiment a gear motor 61 rotates the rotating rake 10, wherein the gear motor 61 is installed to the upper portion of the last pulper 8. A rotating axle 62 is connected to the drive, extending to a rotating rake hub 65. At least two support arms 64 are installed to the hub; to the other end of the support arms 64 are installed equally long rake spikes 63. The rake rotates with the drive. The drive is mounted at a height allowing the spikes to submerge below the surface L3 of the last pulper, enabling the movement of the coarse reject forward on the conveyor vessel 9. The direction of rotation is illustrated by an arrow 66. In one embodiment each support arm 64 comprises at least two spikes 63.

A rotor unit is disclosed for processing pure fiber materials such as pulp, bio waste or similar recyclable material with a rotating device. The rotor unit may be installed vertically to the lower portion of a vessel, a tank or a pulper. Hereinafter the combination of a vessel and the rotor unit is referred to as the pulper. Below the rotor there is configured a device body and a perforated plate, a screen plate. In one embodiment the screen plate is a circular plate under the rotor. The screen plate may comprise openings, holes, gaps, long slits or any shape selected purposively, wherein the shape is selected to prohibit for example hard particles larger than a 3 mm diameter from penetrating the screen plate. The screen plate is configured to allow slushed pulp, fiber material on bio waste to penetrate through the screen plate. The penetrated material may have quality requirements for example for the decomposing characteristics or impurities. Purified mass allows smaller openings and lower concentration when the mass flows to further processing. For example a concentration below 3% to 4% is disadvantageous if the fibers are to be processed by refining.

There is an economical reason to aim for smaller volume pulpers. To achieve a desired capacity, the smaller volume pulpers must have a greater dry content than the exit concentration of said 3-4%. For example, the mass from bales reaches up to 10%. Such high concentration cannot be effectively pumped through the screen plate without diluting the mixture of water and particles of recyclable material. The diluting water provides a better effect when it is directed to the surface of the screen plate instead of the pulper—otherwise the overall concentration of the recyclable material in the vessel would be diluted.

Screen plate holes preventing about 3 mm particles from entering the further processing purify the recycled pulp mass sufficiently, thereby replacing traditional coarse screening. This has a positive effect on the required investments in material and devices. FI122071 discloses a double layer rotor, wherein the upper pumping wings slush pulp bales and the rotors below are configured to clean the screen plate. The diluting water is directed below the top rotor to the screen plate, wherein the diluting water does not significantly dilute the pulper content. The solution allows the concentration above the rotor to be 10%, and the mass penetrated the screen plate would have a 2%-4% concentration.

Figure 10:
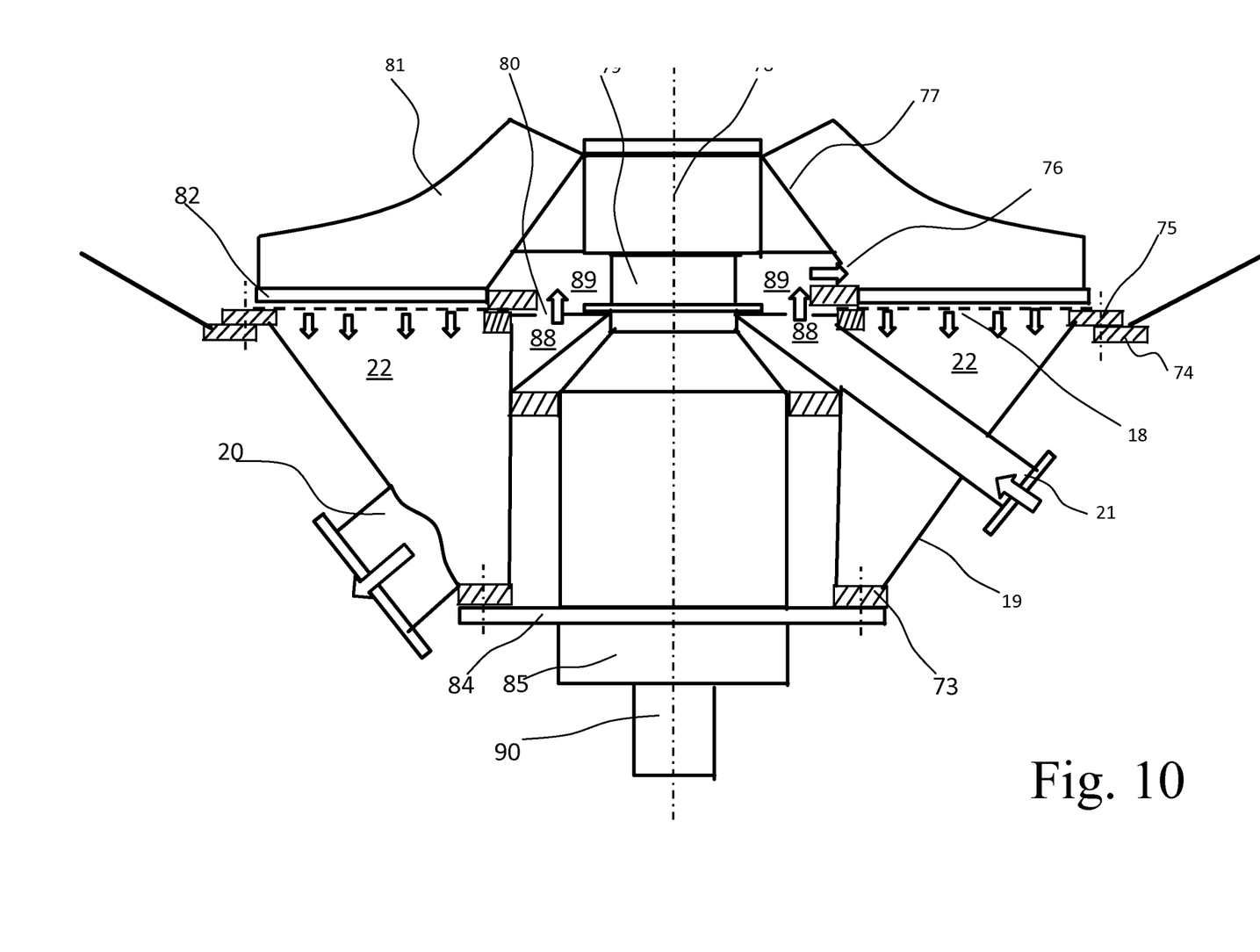
FIG. 10 illustrates one schematic embodiment of a rotor unit.

Hereinafter is disclosed a single layer rotor, wherein the diluting water is directed to the screen plate. The single layer rotor is simpler, more robust, easier to manufacture and to maintain. FIG. 10 illustrates one embodiment of the rotor unit. In one embodiment the rotor unit according to FIG. 10 is used with the arrangement according to FIG. 1, for example replacing any of the rotor units R1, R2 or R3.

The rotor unit comprises a body 19, a rotor 78, a bearing 85 and a screen plate 18. The rotor unit is in one embodiment installed with a flange 75 to the flange of a pulper vessel flange 74. The rotor 78 is joined to the axle protruding from the bearing 85 into an axle 90. The rotor 78 comprises at least two wings 81 configured to slush recycled material in a rotating action and to pump the recycled material. The rotating action causes the at least two wings 81 to mix the recycled material vigorously. The recycled material is decomposed for example by a turbulence caused by the rotor 78. In the vicinity of the screen plate 18 rotate at least two foils 82 configured to clean the screen plate 18. The rotating foils 82 cause a turbulence near the openings of the screen plate 18, thus preventing particles from jamming to the screen plate 18. The rotor 78 comprises a cone-shaped body 77, wherein the at least two wings 81 and the at least two foils 82 are attached. Slightly above the foils 82 or at the same level with the foils 82 are openings 76 configured to allow the diluting water to pass through near to the screen plate 18. The size of the openings 76 is configured according to the diluting water flow characteristics. In one embodiment the foils 82 are attached to the lower edge of the wings 81.

The diluting water is brought to a space 88 in the body 19 via a pipework 21. From the space 88 the diluting water flows through openings 80 under the rotor 78 to a circular space 89, from where the diluting water flows through the openings 76 to dilute the mixture of water and particles of recycled material. The foils 82 rotate at a distance of about 3 mm from the screen plate. A portion of the diluting water flows to the screen plate 18 from the aforementioned 3 mm opening. The 3 mm measurements describes hereinbefore are only examples. The measurements may vary according to the recycled material and typical particle size of the accepted and/or the rejected material. The diluting water dilutes the slushed material on the screen plate, causing the material to flow through the small openings. Below the screen plate 18 there is a circular space 22 from where the slushed material is pumped via a tubular assembly to the outlet 20 to further processing.

The drive provides a rotating movement that is transformed via the axle 90 to the rotor 78. The axle 90 is supported to the bearing unit 85, which is in turn installed by a flange 84 to the body flange 73. The bearing unit 85 comprises a sealing 79 preventing the water from entering the bearing unit 85.

An apparatus for processing recycled material is disclosed. The apparatus comprises a first pulper having an inlet for receiving recycled material, a water inlet for producing a mixture of water and particles of recycled material, a first rotor unit configured to slush recycled material and a first screen plate connected to a first outlet configured to extract a first portion of the mixture of water and particles of recycled material from the first pulper; a last pulper having a reject washer configured to remove coarse rejected recycled material from the last pulper; and an upper channel from the first pulper to the last pulper, wherein the mixture of water and particles of recycled material is configured to flow over from the first pulper to the last pulper. The apparatus further comprises a bottom of the last pulper being lower than or at the same level as the first pulper; a lower channel at the bottom of the first pulper extending to the last pulper; and a gate at the lower channel, configured to cause, when open, the mixture of water and particles of recycled material to flush to the last pulper. In one embodiment the first pulper and the last pulper are configured in a vessel, wherein the vessel is positioned horizontally. In one embodiment vessel is a cylindrical tank positioned horizontally. In one embodiment the first pulper and the last pulper are configured at the opposite ends of the tank, wherein the tank is tilted with the end of the first pulper positioned higher than the end of the last pulper. In one embodiment the reject washer comprises a screw conveyor configured to lift coarse rejected recycled material from the last pulper. In one embodiment the reject washer comprises a rotating rake configured to lift or transfer coarse rejected recycled material to the screw conveyor or towards the screw conveyor. In one embodiment between the first pulper and the last pulper there is at least one intermediate pulper; an intermediate rotor unit configured to slush the mixture of water and particles of recycled material and an intermediate screen plate connected to an intermediate outlet configured to extract an intermediate portion of the mixture of water and particles of recycled material from the intermediate pulper; wherein the intermediate pulper is configured to receive the overflow from the upper channel from the first pulper and allow it to flow over to a consecutive intermediate pulper or to the last pulper in a consecutive upper channel; the lower channel at the bottom of the first pulper extends to the intermediate pulper, wherein the intermediate pulper is configured to receive the flush from the lower channel from the first pulper; the intermediate pulper comprising a consecutive lower channel extending to the consecutive intermediate pulper or to the last pulper; and a consecutive gate at the consecutive lower channel configured to cause, when open, the mixture of water and particles of the recycled material to flush to the consecutive intermediate pulper or to the last pulper. In one embodiment the first rotor unit is in an inclined position in the lower portion of the vessel, allowing flushing of the bottom of the vessel. In one embodiment the apparatus comprises a partition wall separating the vessels in the tank. In one embodiment the gate is a door plate on a partition wall, wherein the door plate is configured to be lifted along rails arranged on both sides of the door plate. In one embodiment the last pulper comprises a last rotor unit configured to slush recycled material and a last screen plate connected to a last outlet, wherein a portion of the diluting water from the last pulper is piped to the first pulper via pipework.

A method for flushing an apparatus for processing recycled material is disclosed. The apparatus comprises: a first pulper having an inlet for receiving recycled material, a water inlet for producing a mixture of water and particles of recycled material, a first rotor unit slushing the mixture of water and particles of recycled material and a first screen plate connected to a first outlet extracting a first portion of the mixture of water and particles of recycled material from the first pulper; a last pulper having a reject washer removing coarse rejected recycled material from the last pulper; and an upper channel from the first pulper to the last pulper, wherein the mixture of water and particles of recycled material overflows from the first pulper to the last pulper. The method comprises opening a gate at a lower channel extending from the first pulper to the last pulper, causing the mixture of water and particles of recycled material to flush to the last pulper. In one embodiment the reject washer comprises a rotating rake lifting or transferring coarse rejected recycled material to a screw conveyor or towards the screw conveyor. In one embodiment between the first pulper and the last pulper there is at least one intermediate pulper; an intermediate rotor unit slushing recycled material and an intermediate screen plate connected to an intermediate outlet extracting an intermediate portion of recycled material from the intermediate pulper; wherein the intermediate pulper receives the overflow from the upper channel from the first pulper and allows it to flow over further to a consecutive intermediate pulper or to the last pulper in a consecutive upper channel; the lower channel at the bottom of the first pulper extending to the intermediate pulper, wherein the intermediate pulper receives the flush from the lower channel from the first pulper; the intermediate pulper comprising a consecutive lower channel extending to the consecutive intermediate pulper or to the last pulper; and a consecutive gate, when open, at the consecutive lower channel causing the mixture of water and particles of the recycled material to flush to the consecutive intermediate pulper or to the last pulper. In one embodiment the gate is a door plate on a partition wall, wherein the door plate is lifted along rails arranged on both sides of the door plate.

A rotor unit in a vessel containing a mixture of water and particles of recycled material is disclosed. The rotor unit comprises a rotor unit body; a screen plate installed to the rotor unit body, configured to separate accepted recycled material penetrated through the screen plate and rejected recycled material remaining in the vessel; an outlet for the accepted recycled material in the lower portion of the vessel; a rotor connected to the rotor unit body and configured to rotate inside the vessel, comprising at least two wings configured to slush recycled material in a rotating action and at least two foils configured to clean the screen plate by rotating above the screen plate; a space around the rotor defined by a rotor body; pipework configured to bring diluting water from outside the vessel to the space around the rotor; wherein the rotor body defining the space around the rotor comprises at least one opening allowing the diluting water to pass through the at least one towards the mixture of water and particles of recycled material. The at least one at the rotor body is at the same level with a lower edge of the at least two wings or the at least two foils, wherein the diluting water is allowed to pass through the at least one to the screen plate. In one embodiment the space around the rotor defined by the rotor body has an annular shape. In one embodiment the lower edge of the at least two wings are configured to rotate at the same level as the at least two foils.

A method for diluting a mixture of water and particles of recycled material in a vessel is disclosed. The method comprises a rotor unit, a rotor unit body, a screen plate installed to the rotor unit body, separating accepted recycled material penetrated through the screen plate and rejected recycled material remaining in the vessel; an outlet for the accepted recycled material in the lower portion of the vessel; a rotor connected to the rotor unit body, rotating inside the vessel, comprising at least two wings slushing recycled material in a rotating action and at least two foils cleaning the screen plate by rotating above the screen plate; and pipework bringing diluting water from outside the vessel and streaming the diluting water towards the mixture of water and particles of recycled material. The method comprises allowing the diluting water to pass through at least one opening at the rotor body to the screen plate, wherein the at least one opening is at the same level with the lower edge of the at least two wings or the at least two foils. In one embodiment the space around the rotor defined by the rotor body has an annular shape. In one embodiment the lower edge of the at least two wings rotates at the same level as the at least two foils.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

The term 'comprising' is used herein to mean including the method blocks or elements identified, but that such blocks or elements do not comprise an exclusive list and a method or apparatus may contain additional blocks or elements. It will further be understood that reference to 'an' item may refer to one or more of those items.

It is obvious to a person skilled in the art that with the advancement of technology, the basic idea of the invention may be implemented in various ways. The invention and its embodiments are thus not limited to the examples described above; instead they may vary within the scope of the claims.

The invention claimed is:

1. An apparatus for processing recycled material, comprising:
    a first pulper having an inlet for receiving recycled material, a water inlet for producing a mixture of water and particles of recycled material, a first rotor unit configured to slush recycled material and a first screen plate connected to a first outlet configured to extract a first portion of the mixture of water and particles of recycled material from the first pulper;
    a last pulper having a reject washer configured to remove coarse rejected recycled material from the last pulper; and
    an upper channel from the first pulper to the last pulper, wherein the mixture of water and particles of recycled material is configured to flow over from the first pulper to the last pulper,
    wherein a bottom of the last pulper is lower than or at a same level as the first pulper,
    wherein a lower channel at a bottom of the first pulper extends to the last pulper, and
    wherein a gate at the lower channel is configured to cause, when open, the mixture of water and particles of recycled material to flush to the last pulper.

2. The apparatus according to claim 1, wherein the first pulper and the last pulper are configured in a vessel, and wherein the vessel is positioned horizontally.

3. The apparatus according to claim 1, wherein the vessel comprises a cylindrical tank positioned horizontally.

4. The apparatus according to claim 3, wherein the first pulper and the last pulper are configured at opposite ends of the tank, wherein the tank is tilted with an end of the first pulper positioned higher than an end of the last pulper.

5. The apparatus according to claim 1, wherein the reject washer comprises a screw conveyor configured to lift coarse rejected recycled material from the last pulper.

6. The apparatus according to claim 5, wherein the reject washer comprises a rotating rake configured to transfer coarse rejected recycled material towards the screw conveyor.

7. The apparatus according to claim 1, further comprising:
    at least one intermediate pulper disposed between the first pulper and the last pulper;
    an intermediate rotor unit configured to slush recycled material and an intermediate screen plate connected to an intermediate outlet configured to extract an intermediate portion of the mixture of water and particles of recycled material from the intermediate pulper, wherein the intermediate pulper is configured to receive overflow from the upper channel from the first pulper and allow it to flow over to a consecutive intermediate pulper or to the last pulper in a consecutive upper channel, wherein the lower channel at the bottom of the first pulper extends to the intermediate pulper, and the intermediate pulper is configured to receive the flush from the lower channel from the first pulper, and wherein the intermediate pulper comprises a consecutive lower channel extending to the consecutive intermediate pulper or to the last pulper; and a consecutive gate at the consecutive lower channel configured to cause, when open, the mixture of water and particles of the recycled material to flush to the consecutive intermediate pulper or to the last pulper.

8. The apparatus according to claim 1, wherein the first rotor unit is in an inclined position in the lower portion of the vessel, allowing flushing of the bottom of the vessel.

9. The apparatus according to claim 1, wherein a partition wall separates the vessels in the tank.

10. The apparatus according to claim 1, wherein the gate comprises a door plate on a partition wall, and wherein the door plate is configured to be lifted along rails arranged on both sides of the door plate.

11. The apparatus according to claim 1, wherein the last pulper comprises a last rotor unit configured to slush recycled material and a last screen plate connected to a last outlet, wherein a portion of the diluting water from the last pulper is piped to the first pulper via pipework.

12. A method for flushing an apparatus for processing recycled material, said method comprising:

opening a gate at a lower channel extending from a first pulper to a last pulper, causing a mixture of water and particles of recycled material to flush to the last pulper, wherein the apparatus for processing recycled material comprises the first pulper having an inlet for receiving recycled material, a water inlet for producing a mixture of water and particles of recycled material, a first rotor unit slushing the mixture of water and particles of recycled material and a first screen plate connected to a first outlet extracting a first portion of the mixture of water and particles of recycled material from the first pulper, the last pulper having a reject washer removing coarse rejected recycled material from the last pulper, and an upper channel from the first pulper to the last pulper, wherein the mixture of water and particles of recycled material overflows from the first pulper to the last pulper.

13. The method according to claim 12, wherein the reject washer comprises a rotating rake transferring coarse rejected recycled material towards a screw conveyor.

14. The method according to claim 12, wherein between the first pulper and the last pulper there is at least one intermediate pulper;

an intermediate rotor unit slushing the mixture of water and particles of recycled material and an intermediate screen plate connected to an intermediate outlet extracting an intermediate portion of the mixture of water and particles of recycled material from the intermediate pulper;

wherein the intermediate pulper receives overflow from the upper channel from the first pulper and allows it to flow over further to a consecutive intermediate pulper or to the last pulper in a consecutive upper channel;

the lower channel at the bottom of the first pulper extending to the intermediate pulper, wherein the intermediate pulper receives the flush from the lower channel from the first pulper;

the intermediate pulper comprising a consecutive lower channel extending to the consecutive intermediate pulper or to the last pulper; and a consecutive gate, when open, at the consecutive lower channel causing the mixture of water and particles of the recycled material to flush to the consecutive intermediate pulper or to the last pulper.

15. The method according to claim 12, wherein the gate comprises a door plate on a partition wall, wherein the door plate is lifted along rails arranged on both sides of the door plate.

* * * * *